No. 749,497.

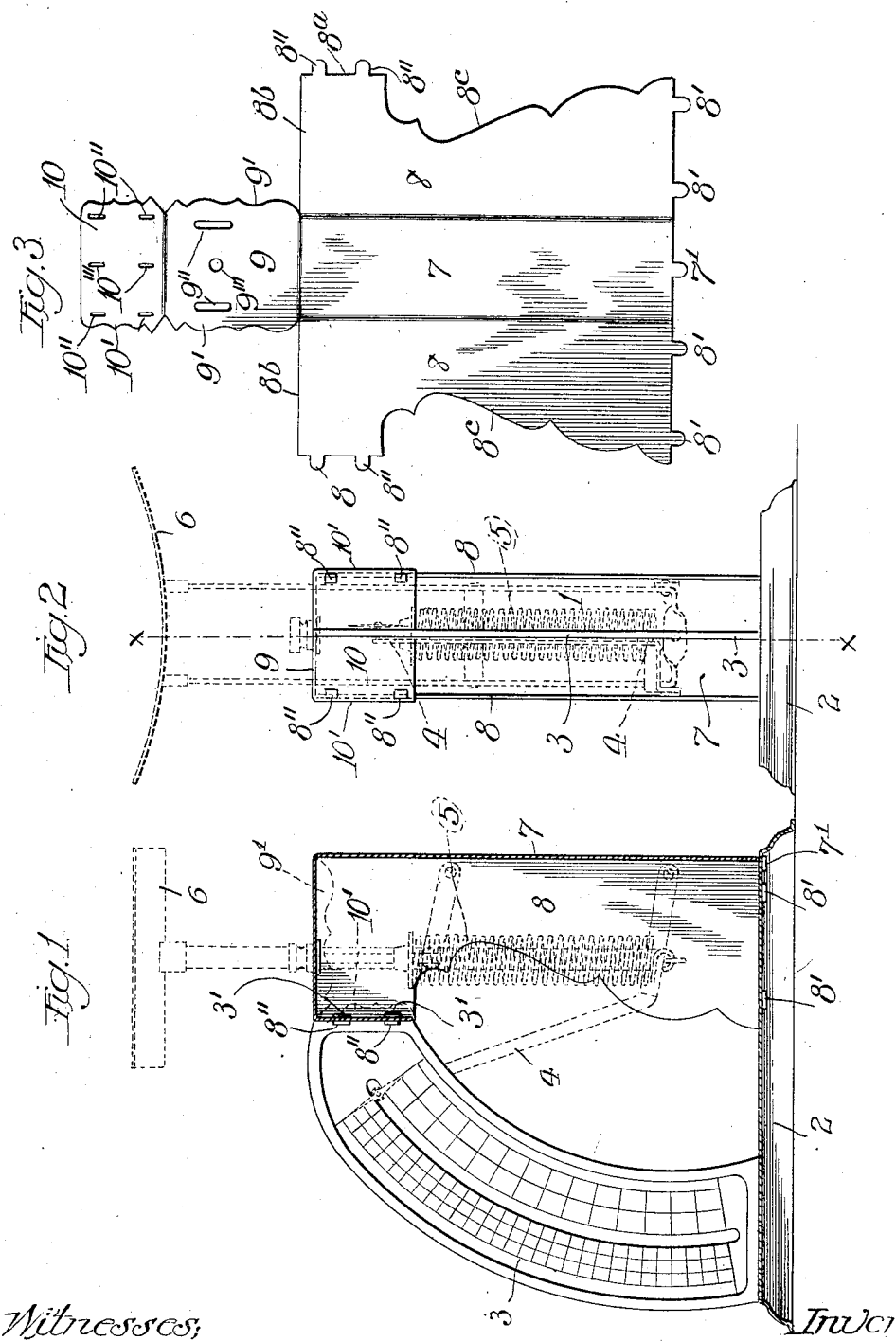

Patented January 12, 1904.

UNITED STATES PATENT OFFICE.

WILLIAM N. PELOUZE, OF CHICAGO, ILLINOIS.

SINGLE-PIECE SHEET-METAL SCALE-CASE AND BLANK THEREFOR.

SPECIFICATION forming part of Letters Patent No. 749,497, dated January 12, 1904.

Application filed May 11, 1903. Serial No. 156,681. (No model.)

*To all whom it may concern:*

Be it known that I, WILLIAM N. PELOUZE, of the city of Chicago, county of Cook, and State of Illinois, have invented a certain new, useful, and Improved Single-Piece Sheet-Metal Scale-Case and Blank Therefor, of which the following is a specification.

My invention relates to postal weighing-scales, and has particular reference to that class of scales in which the weighing or load pan is arranged above the body of the scale and wherein the scale mechanism is mainly concealed within said body or case. These postal scales command small prices in the market, and yet to be salable must be accurate, durable, and compact, and of neat appearance. The standard of accuracy and durability in the working parts of the scale must be maintained. The manufacturing cost of these parts is practically fixed, and if a saving is to be effected that saving must occur in the manufacture of the scale-casing.

The object of my invention is to so improve and simplify the construction of postal scales that the same may be manufactured for less than the present-day scales, and may therefore be placed on the market at a price that shall be within the reach of all purchasers.

The particular object of my invention is to provide a single-piece sheet-metal case that may be manufactured at low cost and which will be perfectly rigid and strong and yet be of light weight and of pleasing appearance.

With these objects in view my invention consists of a pillar-like scale-case to contain and support the scale mechanism, and which comprises a single piece of metal of pleasing outline and constituting the four walls and the top of the scale, said top and the front wall being extensions of the back portion of the case.

The invention consists particularly of a sheet-metal blank comprising a single back portion, two side portions, a top and a front portion, said top being bent forward to fasten said side portions, and front portion being bent downwardly and attached to the front edges of said side portion.

My invention also consists in combinations of parts and in particular constructions, all as hereinafter described, and pointed out in the claims.

The invention will be more readily understood by reference to the accompanying drawings, forming a part of this specification, and in which—

Figure 1 is a vertical section of my postal scale in side elevation on the line $x\,x$ of Fig. 2. Fig. 2 is a front view of the postal scale, and Fig. 3 is a view of the sheet-metal casing in the flat or blank ready to be folded.

As shown in the drawings, 2 represents the scale-base, preferably a sheet-metal stamping.

3 represents the scale-plate, having suitable graduations and curved to conform to the sweep of the pointer 4. Said pointer 4, the scale-spring 5, the parts associated with the spring, and the weighing or load pan 6 are shown in dotted lines only, as the same do not directly enter into this invention.

The scale mechanism is protected, supported, and partially concealed by the scale-casing that is erected on the base 2 and which constitutes my invention. This case, as shown in Fig. 2, is of considerable width in order that it may accommodate the scale mechanism. It is made up of a single piece of sheet metal which in the blank or flat form possesses the outline shown in Fig. 3. The blank comprises the rectangular back portion 7, the side portions 8 8, the top portion 9, and the front portion 10. The back 7 is provided with a lug 7' at its lower end, and the side portions 8 8 have corresponding lugs 8' 8'. The upper edges $8^a$ and $8^b$ of the side portions are respectively parallel with and perpendicular to the lines of the folds between the back and the sides. The greater portion $8^c$ of the edge of each side 8 is cut out or scalloped in pleasing design, and the smaller portion $8^a$ is provided with fastening or clenching lugs 8" 8". The top portion 9 is practically an extension of the back 7, and the portion 10 is in turn an extension of the top 9. The top 9 is of the same length as the edges $8^b$ of the sides 8 and is provided with extending scalloped edges or portions 9', that are adapted to fold down over the sides 8 when the sides and top are bent forward upon the back, as shown in Fig. 1. The front portion 10 is of the same length and depth as the edges 8ª of the sides 8 and is provided with extending scalloped edges 9', that fold back upon the sides 8 when the portion 10 is turned downwardly, as shown in Figs. 1 and 2. The top 10 has lug-slots 10'', that receive the side lugs 8'', and these being folded or clenched complete the rigid connection of the parts or portions. A very light and yet particularly strong case is thus completed and is secured upon the base by the clenching of the lugs 7' and 8', that pass through holes in the base 2, as shown in Fig. 1. The portion 10, it will be observed, serves as a bridge between the sides to accommodate the upper end of the scale-frame 3, which has lugs 3', that pass through and are clenched in the middle slots 10''' in the portion 10. The top 9 is provided with openings 9'' for the load-pan posts and also has a hole 9''' for the spring-adjusting screw.

As it is obvious that minor modifications of my invention will readily suggest themselves to one skilled in the art and that such modifications may be made without departing from the spirit of my invention I do not confine the same to the specific constructions herein shown and described.

Having thus described my invention, I claim as new and desire to secure by Letters Patent—

1. A postal weighing-scale frame, comprising the base, in combination, with the pillar-like scale-case erected thereon and composed of a single piece of sheet metal stamped and folded to form the back, sides, top and front of the case, the forward edges of said sides being scalloped and the scale-plate erected upon said base and having its upper end secured upon said front portion of the case, substantially as described.

2. A postal weighing-scale frame, comprising a base, in combination with a pillar-like scale-case erected thereon and composed of a single piece of sheet metal, stamped and folded to form the back, sides, top and front of the case, and the scale-plate erected upon said base and having its upper end secured upon said front portion of said case, substantially as described.

3. In a frame for weighing-scales, a base, a pillar-like scale-case attached to said base and formed of a single sheet of metal, adapted to contain the weighing mechanism, said case being open at the front, in combination with a vertical, curved scale-plate erected on said base and having its upper end vertically attached to said case, substantially as described.

4. A postal-scale frame, comprising a base, in combination with a pillar-like case erected thereon, said case having an open front and being constructed of a single sheet of metal, and the scale-plate erected on said base and unattached to said case save at its upper end, substantially as described.

5. A frame for postal scales, comprising, in combination, a base, a scale-plate erected thereon and occupying a vertical plane, and a pillar-like case formed of a single sheet of metal, provided with an open front, and means at the upper part of said open front for attaching said scale-plate, substantially as described.

6. A frame for postal weighing-scales, comprising, in combination, a base, a scale-plate, and a pillar-like case erected thereon, said case being formed of a single sheet of metal and provided with an open front, and means upon said open front for attaching one end of said scale-plate, substantially as described.

In testimony whereof I have hereunto set my hand, this 6th day of May, 1903, at Chicago, Illinois, in the presence of two witnesses.

WILLIAM N. PELOUZE.

Witnesses:
C. G. HAWLEY,
JOHN H. GARNSEY.